(No Model.)

L. C. WING.
FRUIT SEEDER AND CLEARER.

No. 453,685. Patented June 9, 1891.

Witnesses:
Hermann Bormann
Richard C. Maxwell

Inventor:
Lingan C. Wing
by J. Walter Douglass
Att'y.

UNITED STATES PATENT OFFICE.

LINGAN C. WING, OF BOSTON, MASSACHUSETTS.

FRUIT SEEDER AND CLEARER.

SPECIFICATION forming part of Letters Patent No. 453,685, dated June 9, 1891.

Application filed September 18, 1890. Serial No. 365,356. (No model.)

*To all whom it may concern:*

Be it known that I, LINGAN C. WING, a citizen of the United States, residing at the city of Boston, in the county of Suffolk and State of Massachusetts, have invented certain new and useful Improvements in Fruit Seeders and Clearers, of which the following is a specification.

It is well known by those skilled in the culinary art that preserved and dried fruits—such as raisins and the like—are largely employed in the preparation of certain puddings, cakes, and other dishes in order to impart their characteristic richness and flavor to the same; and it is also well understood that in order to attain the best results in practice it is necessary to remove the seeds and other hard or gritty matter before using such fruits in the preparation of the dishes.

The principal object of my invention is to provide a simple, durable, and efficient instrument or device for removing seeds and other hard or gritty matter from small fruits in a neat and expeditious manner.

My invention consists of a seeding device constructed and arranged for operation, substantially as hereinafter described, and pointed out in the claims.

The nature and characteristic features of the invention will be more fully understood from the following description, taken in connection with the accompanying drawings, forming part hereof, and in which—

Figure 1:
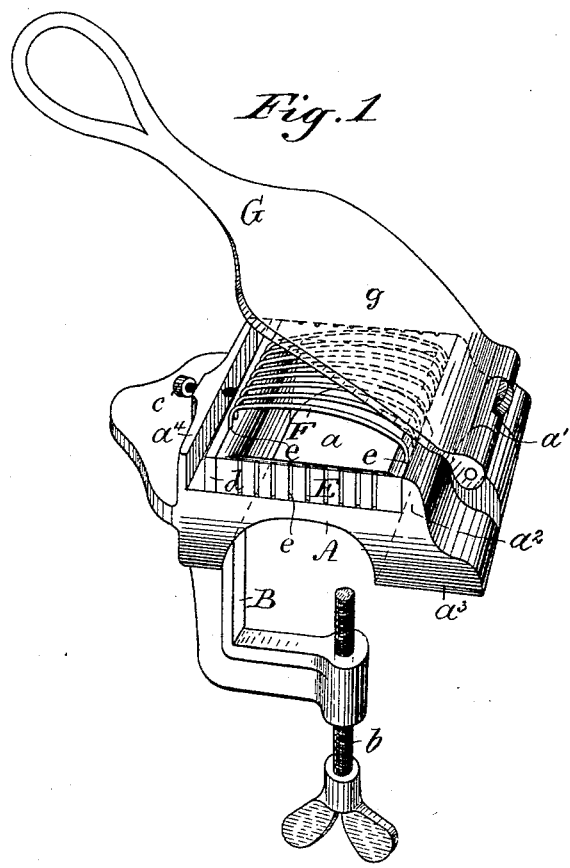
Figure 2:
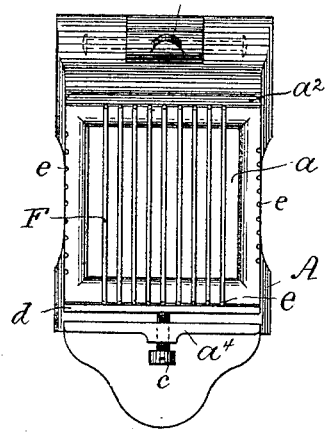

Figure 1 is a perspective view of a fruit seeder and clearer embodying features of my invention and showing the hand-pressure lever thereof elevated in order to expose to view a screen or sieve adapted for the reception of the fruit and composed of diverging springs or wires; and Fig. 2 is a top or plan view of a modified form of sieve or screen in which the wires or springs thereof are disposed in a parallel manner with relation to each other.

In the drawings, A is a base-plate, having an aperture $a$ formed therein and provided with a lug $a'$, fixed lips $a^2$ and $a^4$, and arched legs or feet $a^3$.

B is a curved arm attached to or formed integral with the base-plate A and provided with a thumb-screw $b$ for clamping the fruit seeding or clearing device to the edge of a table or other suitable support.

C is a set-screw, having its seat in a tapped orifice formed in the fixed lip $a^4$, attached to the frame B or supported in any other preferred manner, so as to be capable of being advanced toward or withdrawn from the aperture $a$.

$d$ is a movable lip or jaw contacting with and adapted to be actuated by means of the set-screw C.

E is a hollow rectangular or other preferred form of frame adapted to fit over the aperture $a$, and having recesses, teeth, or serrations $e$ cut or otherwise formed upon its exterior sides, for a purpose to be presently described. The serrations on the opposite sides of the frame E may be equally or unequally spaced, and the spaces between the respective serrations on two corresponding sides of the frame may be arranged differently from those on the other corresponding sides thereof.

F are curved or arched wires or springs, having their respective extremities bent downward and at right angles to the arched portions thereof. In use the extremities of these springs or wires are inserted into the serrations $e$, formed upon the exterior surface of the frame E, and are clamped firmly to place between the respective sides of the frame and the fixed lip $a^2$ and movable jaw $d$. If the serrations $e$ on one side of the frame are spaced nearer together than they are on the opposite corresponding side thereof, the respective wires or springs F will occupy positions diverging from each other, as shown in Fig. 1; but if the serrations $e$ on the opposite sides of the frame are equally spaced the respective wires or springs F will occupy positions parallel to each other.

The distance between the respective wires or springs E, as well as their arrangement, may be varied by providing frames having the serrations on their respective opposite and corresponding sides differently spaced, and the distance between these wires or springs of course depends upon the character of fruit to be operated upon. It may be remarked that by providing frames having the serrations differently disposed with relation to one another upon the respective opposite sides thereof the wires or springs F may be adjusted so as to occupy parallel or divergent positions by the simple operation of removing the frame and turning it around and then clamping it to place in the manner above described.

G is a hand-lever pivotally attached to the lug $a'$ and provided with a somewhat flattened and recessed portion $g$, adapted to press the fruit downward upon the screen or sieve.

The mode of operation of the hereinabove-described fruit seeding and clearing device is as follows: The hand-lever G is raised, for example, as illustrated in Fig. 1, and the fruit is laid lengthwise onto the screen or sieve. The hand-lever G is then depressed and the flat portion $g$ thereof is brought down upon the fruit with sufficient pressure to cause the wires or springs F to cut the skin of the fruit, thereby allowing the seeds and other hard or gritty matter to pass through the screen. The fruit may then be removed from the screen or sieve for use and the above operation repeated, care being taken in due course to remove the seeds and other hard or gritty matter from beneath the screen or sieve. This result may be readily accomplished by pushing the accumulation of seeds and other matter from beneath the plate A through the arched legs or feet $a^3$ thereof.

In some instances where the fruit is of a sticky or glutinous nature it is found to be a difficult matter to effectually separate the seeds from the fruit; but even in such instances excellent results may be attained in practice by employing in a device of the character hereinbefore described wires or springs F, Fig. 1, which diverge, so as to form wedge-shaped spaces between them and thereby readily permit of the passage therethrough of the seeds only at or near the widest portions of said spaces. By arranging the wires or springs F so as to diverge, as above described, the fruit is effectually deprived of its seed without loss of any of the meat or pulp of the fruit, because the seed is forced from the fruit through the wider portions of the spaces by the pressure exerted upon the lever G and the seeds detached therefrom by simply drawing the fruit by hand or otherwise toward the divergent points of the wires or springs F, and since the narrow portions of the spaces are much narrower than the seeds to be removed from the fruit they cannot, therefore, pass between the wires or springs F at said portions of the spaces, but are caught and retained beneath said wires or springs and the fruit entirely freed therefrom in the removal thereof from the device by hand or in any other more convenient manner. In most cases, however, the results attained by the employment of parallel wires or springs have been entirely satisfactory.

It will be obvious to those skilled in the art to which my invention appertains that modifications may be made in details thereof without departing from the spirit of the invention. For example, the wires or springs may be attached directly to the plate A without the interposition of the lip and movable jaw. Hence the invention is not limited to the exact construction and arrangement of parts such as hereinbefore explained.

Having thus described the nature and objects of my invention, what I claim as new, and desire to secure by Letters Patent, is—

1. A fruit seeder or clearer comprising a base-plate with an adjustable clamping device, a frame mounted in said base-plate, wires or springs having their depending extremities connected with said frame and base-plate, and a pressure-lever pivotally attached to said base-plate, substantially as and for the purposes set forth.

2. A fruit seeder or clearer having a base-plate with an adjustable clamping device, a serrated frame mounted in said base-plate, divergently-disposed wires or springs connected with said frame and plate, and a pressure-lever pivotally attached to said plate, substantially as and for the purposes set forth.

3. A fruit seeder or clearer having a base-plate with a clamping device, a serrated frame with an aperture therein mounted in said base-plate, arched wires or springs connected with said frame and plate, and a pressure-lever pivotally attached to said plate, substantially as and for the purposes set forth.

4. The combination, in a fruit seeder or clearer, of a base-plate provided with a recess and having a pressure-lever journaled thereto, a fixed lip, a movable jaw, a hollow frame, a sieve or screen composed of wires or springs having the extremital parts clamped between said frame, lip, and jaw, and means for actuating said movable jaw, substantially as and for the purposes set forth.

5. The combination of a base-plate provided with a recess and having a pressure-lever journaled thereto, a fixed lip, a movable jaw, a hollow frame having serrated sides, a sieve or screen composed of arched wires or springs having the extremities mounted in the serrations of said frame and clamped between said lip and jaw, and means for adjusting said frame with relation to said lip and jaw, substantially as and for the purposes set forth.

In witness whereof I have hereunto set my signature in the presence of two subscribing witnesses.

LINGAN C. WING.

Witnesses:
LISLE STOKES,
J. WALTER DOUGLASS.